United States Patent
Boothe et al.

[15] 3,640,300
[45] Feb. 8, 1972

[54] FLUID AMPLIFIER FREQUENCY MULTIPLIER

[72] Inventors: Willis A. Boothe, Scotia; Salvatore Bottone, Jr., Schenectady, both of N.Y.

[73] Assignee: The United States of America as represented by the Secretary of the Air Force

[22] Filed: Dec. 10, 1969

[21] Appl. No.: 883,711

[52] U.S. Cl. ........................................................ 137/81.5
[51] Int. Cl. ................................................... F15c 1/12
[58] Field of Search ........................................ 137/81.5

[56] References Cited

UNITED STATES PATENTS

| | | | |
|---|---|---|---|
| 3,159,168 | 12/1964 | Reader | 137/81.5 |
| 3,180,575 | 4/1965 | Warren | 137/81.5 X |
| 3,266,510 | 8/1966 | Wadey | 137/81.5 |
| 3,409,032 | 11/1968 | Boothe et al. | 137/81.5 X |
| 3,437,099 | 4/1969 | Griffin, Jr. | 137/81.5 |
| 3,447,554 | 6/1969 | Josephson | 137/81.5 |
| 3,456,668 | 7/1969 | Wheeler, Jr. | 137/81.5 |
| 3,465,773 | 9/1969 | Ahern | 137/81.5 |
| 3,504,690 | 4/1970 | Rose | 137/81.5 |
| 3,513,867 | 5/1970 | Manion | 137/81.5 |
| 3,521,655 | 7/1970 | Glaze | 137/81.5 |

*Primary Examiner*—Samuel Scott
*Attorney*—Harry A. Herbert, Jr. and Ruth G. Codier

[57] ABSTRACT

The fluid amplifier may be considered as including a device in which is formed the initial fluid flow pattern and which constitutes the main power input, the control inputs and the receiver, or output. At chosen points second fluid jets are admitted in chosen directions and under chosen flow rate and pressures to modify and control the main jet in a chosen or logical way. A third jet may be interposed from an opposite direction for further modification of the main jet. The main jet may be modified in such a way as to produce an output wave having a frequency that is twice the input frequency. Using two amplifier elements in said series produces an output four times the frequency of the input, N amplifiers in series producing $2^N$ times the frequency of the input.

2 Claims, 5 Drawing Figures

PATENTED FEB 8 1972

INVENTORS
WILLIS A. BOOTHE
SALVATORE BOTTONE JR.
BY Harry A. Herbert Jr
and
ATTORNEYS

FLUID AMPLIFIER FREQUENCY MULTIPLIER

BACKGROUND OF THE INVENTION

The invention relates to a fluid amplifier frequency multiplier, and more particularly to a fluid amplifier having rectifier-type characteristics of rugged construction and high performance.

Electrical and mechanical control engineers are faced with increased demands for control systems with higher performance. These demands include greater accuracy, higher response, improved signal-to-noise ratios. New approaches from conventional methods must be found.

Existing control systems are subject to environmental problems. Mechanical shock, vibration, nuclear radiation and high temperature are a few of them. Electrical and mechanical components are sometimes incapable of withstanding the conditions imposed. They are subject to frictional wear, breakdowns and the resulting hazardous conditions.

SUMMARY OF THE INVENTION

The object of the invention is, therefore, to produce a device which has all of the characteristics of high performance, rugged construction, imperviousness to extreme environmental conditions and at the same time widely adaptable. It has use, for example, in aerospace programs.

The use of fluidics in the present application makes possible a device having no mechanical or moving parts, not subject to deterioration and wear and whose operating lifespan is unlimited. It can be produced at low cost and from any material and its only required characteristics being that it be nonporous and sufficiently rigid to carry fluid ducts.

A further object of the invention is to produce a rectifier-type fluid amplifier whose output wave has a frequency that is twice the input frequency.

Another object of the invention is the provision of a device which has all of the characteristics of durability and dependability, and at the same time is capable of variation of performance to fit a specific need. A primary fluid flow may be modified in a great many different ways by the addition to this primary flow of a second or third jet possessing varying pressure and flow rate characteristics and varying directions of impact. The components described can be coupled with other fluid control components. They can be successfully applied singly, as a unit, in series and other combinations to produce sophisticated control systems, successfully meeting today's increased performance requirements.

These and other advantages, features and objects of the invention will become more apparent from the following description taken in connection with the illustrative embodiment in the accompanying drawings.

DESCRIPTION OF THE DRAWINGS

FIG. 1A is a schematic representation of a primary jet or flow influenced by two opposed control flows superimposed upon it;

FIGS. 2 and 2A show the output for a sinusoidal input, and shows graphically that the output is twice the frequency of the input.

DESCRIPTION OF A PREFERRED EMBODIMENT

Figure 2:
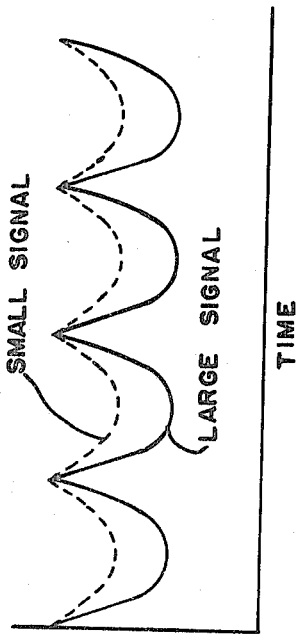
Figure 1:
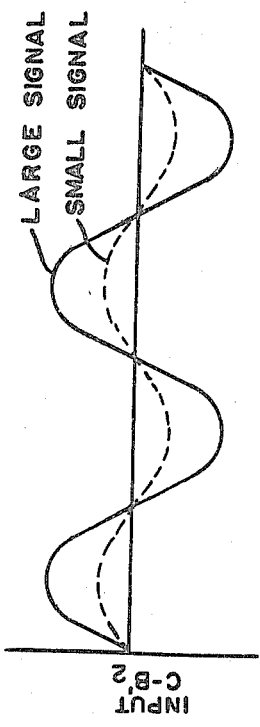
FIG. 1 is a graphic representation of a steady state input-output condition of a rectifier type amplifier, showing that the output pressure drops from the maximum value when the primary stream is deflected to either side.

Referring more in detail to the drawing, in FIGS. 1 and 1A they illustrate the steady state rectifier wherein a single receiver or output nozzle, whose output is represented at $D'$, is centered in line with the power nozzle. The input of this power supply is represented by $P_s$. The frequency can be doubled, that is, input frequency of signal $C-B'_2$ to output frequency at $D'$ becomes 1-2 as shown in FIGS. 2 and 2A. If $C=B'_2$ the power jet impinges fully on the single receiver and a maximum output pressure is achieved.

Figure 3:
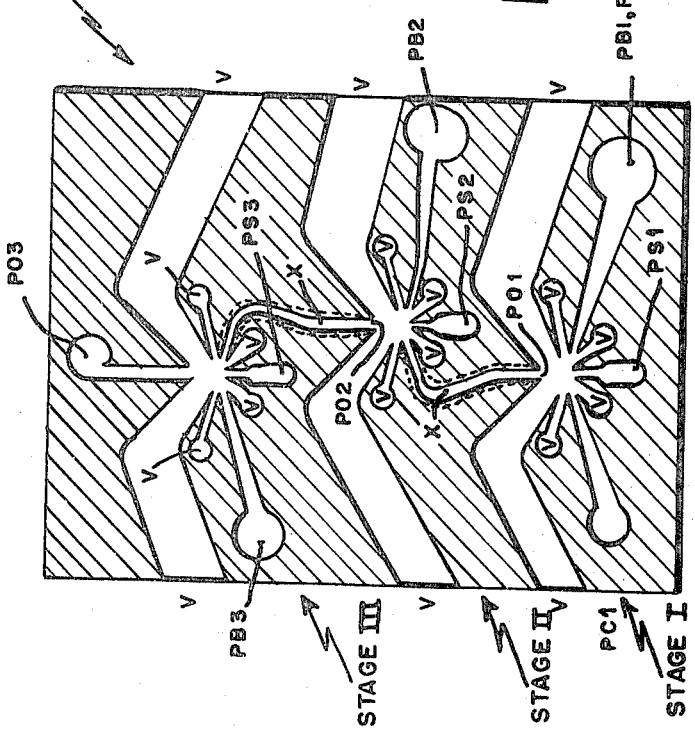
FIG. 3 is a cross-sectional representation of three amplifier units connected in series wherein, a single unit provides output frequency to input frequency in the ratio of 1-2, the series providing a ratio of 1-8.

FIG. 3 is a representation of the device constructed with three units or stages—Stage I, Stage II and Stage III, set up in series. Each unit or stage doubles the ratio of input frequency to output frequency. The three stages are comprised of a duct system in a casing element 10. Vents to atmosphere are indicated, throughout the drawing, by the letter V.

The initial fluid power supply at Stage I is represented by the symbol at $P_{s1}$. That of State II and State III as $P_{s2}$ and $P_{s3}$, respectively. In general, each of these pressures is held constant and $$P_{s3} > P_{s2} > P_{s1}$$

Control fluid or bias pressures are introduced in Stage I at $P_{c1}$ and $P_{c2}$. If input of $P_{c1}$ and $P_{c2}$ is push-pull, that is opposed, then the input signal becomes $P_{c1}-P_{c2}$. If $P_{C1}$ and $P_{C2}$ are not push-pull, then one input signal must be a constant bias pressure, represented by the $P_{B1}$.

Conduit $x$ conducts the fluid which now carries a signal represented by the symbol $P_{01}$ to Stage II. This signal is twice the initial frequency. The signal is further modified by the length of the conduct $x$ which has inductance effect. This conduit may be widened as shown in dotted lines, thereby decreasing this inductance effect but increasing its capacitance. The inductance and capacitance can be designed to filter out specific undesirable harmonics. Additional passive elements such as volumes or restrictors well known to the fluidic art can also be added for additional filtering if desired.

The output signal from Stage I (PO1) enters Stage II, is again doubled and is directed via conduit X to Stage III. This signal is again doubled in Stage III and directed to output PO3 thus obtaining a frequency multiplication of 8:1.

New fluid pressures $P_{s2}$ and $P_{s3}$ are supplied at each stage, and bias or control pressures $P_{B2}$ and $P_{B3}$ are supplied in the second and third stages, respectively. These bias pressures are generally constant, and if $P_{S3} > P_{S2} > P_{S1}$, it follows that $$P_{B3} > P_{B2} > P_{B1}$$

The input signal at the first Stage $P_{c1}$ or $P_{c1}-P_{c2}$ is a variable. If the input is push-pull, bias pressure $P_{B1}$ is not used.

As is now evident $P_{01}$, $P_{02}$ and $P_{03}$ are output pressures of the first, second and third stages, respectively.

Vent passages V are provided for exhausting what may be considered superfluous fluid from the amplifier. These vent passages are generally located between the control fluid inlets and the receivers.

Although the invention has been described with reference to a particular embodiment, it will be understood to those skilled in the art that the invention is capable of a variety of alternative embodiments within the spirit and scope of the appended claims.

We claim:

1. In a fluid amplifier frequency multiplier, a housing element, a first stage frequency amplifying unit in said housing, said first stage unit comprising a fluid inlet and a single fluid outlet directly opposite said inlet, duct elements in said housing forming a continuous conduit from said fluid inlet to said fluid outlet, a primary fluid flow introduced into said inlet to form a first jet, a first control inlet for introducing control fluids at a fixed frequency into said conduit intermediate said inlet and said outlet, a second control inlet for introducing control fluid at a constant biasing pressure into said conduit intermediate said inlet and said outlet, control fluid introduced into said first and second control inlets, the selected characteristics of flow rate and pressure of said control fluid operating as secondary biasing jets for modifying said first jet in a selected manner and imposing upon it logical characteristics, said first jet being so modified that the flow emitted at said output receiver has a frequency twice that of the flow introduced at said first control inlet.

2. A fluid amplifier frequency multiplier wherein a plurality of units as set forth in claim 1 are connected in series to multiply the frequency ratios in stages, said outlet of the first stage communicating with and becoming the control inlet to a second stage, modifying control jets modifying the flow characteristics in said second stage so that the frequency ratio of inlet flow to outlet flow becomes 1 to 4; and a third stage wherein the frequency characteristics of the flow therein are modified by output flow of the second stage so that the frequency ratio of flow introduced at the control inlet of said first stage to the frequency of the outlet flow at said third stage is 1 to 8.

* * * * *